(12) United States Patent
Fan et al.

(10) Patent No.: US 9,587,971 B2
(45) Date of Patent: Mar. 7, 2017

(54) DUAL E-SHAPED HIGH FREQUENCY EXCITER

(71) Applicant: Honeywell International Inc., Morristown, NJ (US)

(72) Inventors: Xianyong Fan, Shanghai (CN); Chuang Huang, Shanghai (CN); Guokun Song, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/806,193

(22) Filed: Jul. 22, 2015

(65) Prior Publication Data

US 2017/0023390 A1    Jan. 26, 2017

(51) Int. Cl.
*G01F 1/84*    (2006.01)

(52) U.S. Cl.
CPC .................................. *G01F 1/8422* (2013.01)

(58) Field of Classification Search
CPC .......................................................... G01F 1/84
USPC ................ 73/861.355, 861.357; 702/56
See application file for complete search history.

(56) References Cited

U.S. PATENT DOCUMENTS

| | | | |
|---|---|---|---|
| 5,069,075 A | 12/1991 | Hansen et al. | |
| 5,531,126 A * | 7/1996 | Drahm | G01F 1/8409 73/861.356 |
| 5,637,804 A | 6/1997 | Hansen | |
| 5,854,430 A * | 12/1998 | Drahm | G01F 1/8409 73/861.354 |
| 6,230,104 B1 * | 5/2001 | Shelley | G01F 1/8413 702/45 |
| 6,758,103 B2 | 7/2004 | Hansen | |
| 7,216,550 B2 | 5/2007 | Lesjak et al. | |
| 7,640,813 B2 | 1/2010 | Storm | |
| 8,590,399 B2 * | 11/2013 | Keita | G01F 1/8468 73/861.355 |
| 8,931,354 B2 | 1/2015 | Ricken et al. | |
| 2007/0186686 A1 * | 8/2007 | Drahm | G01F 1/8409 73/861.357 |
| 2011/0000316 A1 * | 1/2011 | Shimizu | G01F 1/8409 73/861.357 |

* cited by examiner

*Primary Examiner* — Jewel V Thompson
(74) *Attorney, Agent, or Firm* — Kevin Soules; Kermit D. Lopez; Luis M. Ortiz

(57) ABSTRACT

An exciter associated with a mass flow primary comprises a rigid plate comprising a base, two outer struts, and an inner strut; at least one electromagnet formed over the inner strut; a protection circuit associated with the electromagnet; and an exciter circuit configured to induce a current in said electromagnet in order to cause vibration of said exciter.

16 Claims, 5 Drawing Sheets

DUAL E-SHAPED HIGH FREQUENCY EXCITER

FIELD OF THE INVENTION

Example embodiments are generally related to methods, systems, and apparatuses for exciters associated with measuring devices for measuring mass flow.

BACKGROUND

There are numerous applications that require flow meters. Increasingly mass flow meters are necessary. Some mass flow meters make use of exciters. Prior art exciters are generally formed with a frame that is fixed on a pipe and a coil that is fixed on an adjacent pipe. Only one electromagnet is used. When there is a current in the coil, it causes a magnetic field.

In the prior art designs, there are a number of problems. For example, under high frequency vibration, the exciter core will heat up. This creates a potential risk of coil burnout. Also, because there is a small gap between the core and coil, a problem can arise if and when the core and coil come in contact. Such contact may change the natural frequency of the prior art unit and affect its accuracy. Furthermore, the core's weight and the coil frame weight must be controlled; specifically, they must both be the same. If this careful balance is not struck, the vibration may be unbalanced which can cause the whole mass flow meter to be unbalanced.

Therefore, there is a need in the art for an exciter with better performance that can be adjusted to fit and match specific design requirements.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for an exciter.

It is another aspect of the disclosed embodiments to provide a method and system for exciting vibration on a tube associated with a mass flow meter.

It is yet another aspect of the disclosed embodiments to provide an enhanced method and system for inducing vibration in an exciter associated with a mass flow meter.

It is another aspect of the disclosed embodiments to provide a method, system, and apparatus for inducing vibration of mass flow tubes associated with mass flow meters via an exciter configured with multiple electromagnets formed about an E-shaped frame.

The aforementioned aspects and other objectives and advantages can now be achieved as described herein. A method and system for an exciter comprises a rigid plate comprising a base, two outer struts, and an inner strut; at least one electromagnet formed over the inner strut; a protection circuit associated with the electromagnet; and an exciter circuit configured to induce a current in the electromagnet in order to cause vibration of the exciter. The rigid plate comprises a silicon steel plate configured to reduce alternating flux, reduce resistance, and provide operation at high frequency. Additionally, the at least one electromagnet comprises at least two wire windings configured to provide high quality magnetic force and a strong magnetic field. The exciter can further comprise a bone structure configured to engage the electromagnet and the rigid plate. A current inlet pin and a current outlet pin are provided. A protection circuit further comprises at least three resistors and a Zener diode arranged in parallel. A mass flow meter is disclosed wherein the at least one exciter is configured to mount on a flow tube associated with the mass flow meter.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Mass flow meter embodiments disclosed herein are based on the Coriolis-Principle. Unlike traditional flow meters, which use flow velocity or flow volume measurements to derive the flow rate, Coriolis mass flow meters measure the mass flow rate of a product directly. Mass is the only physical parameter which is independent of the other physical properties, including pressure, viscosity, density, and Reynolds Number. In a mass flow meter, the fluid flowing through the device is subject to a Coriolis force which produces a phase shift in a signal provided from a sensor. This phase shift is proportional to the mass flow. Thus, by measuring the phase shift, the mass flow can be determined. An exciter, such as exciters 105 and/or 110, is one element of a mass flow meter that induces a vibration of the tubes the material is flowing through. Current exciters suffer from a number of problems as described above. In the embodiments disclosed herein the exciters solve the indicated problems and provide better overall performance.

Figure 1:
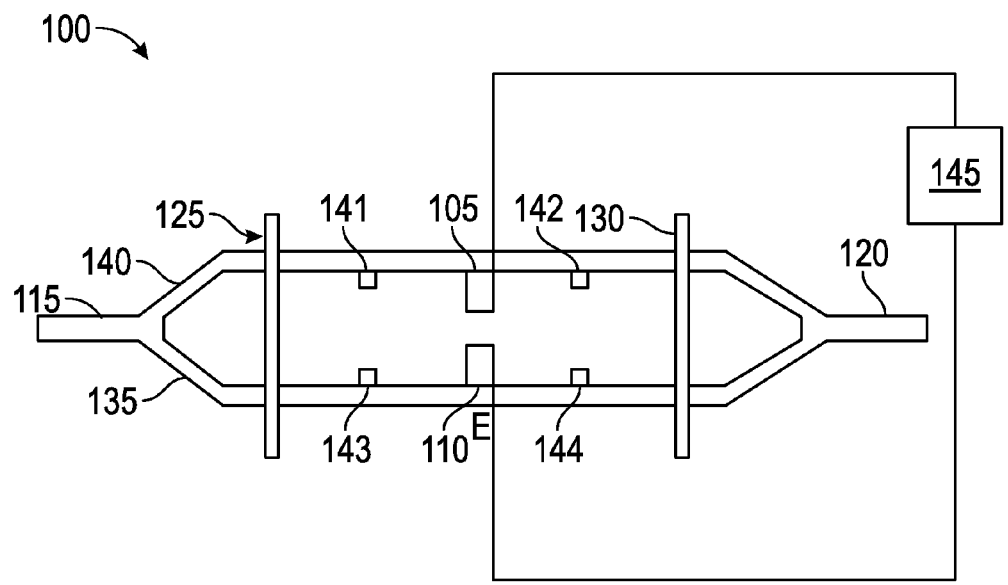
FIG. 1 depicts a mass flow meter in accordance with an embodiment of the present invention.

In one embodiment illustrated in FIG. 1, a mass flow meter 100 is illustrated. Mass flow meter 100 can generally include a flow inlet 115 and flow outlet 120. Two fixed plates 125 and 130 are arranged between flow inlet 115 and flow outlet 120. Flow inlet 120 splits into two separate tubes 135 and 140 through which material may flow. Between fixed plates 125 a series of position sensors 141, 142, 143, and 144 are formed on tubes 135 and 140.

The mass flow meter 100 includes two exciters 105 and 110 formed on tubes 135 and 140 respectively. A power source 145 provides power to the exciters. The exciters are preferably located between the fixed plates 125 and 130 and between the position sensors formed on the same tube. For example, exciter 105 is formed on tube 140 between sensors 141 and 142. Exciter 110 is formed on tube 135 between sensors 143 and 144.

Figure 2:
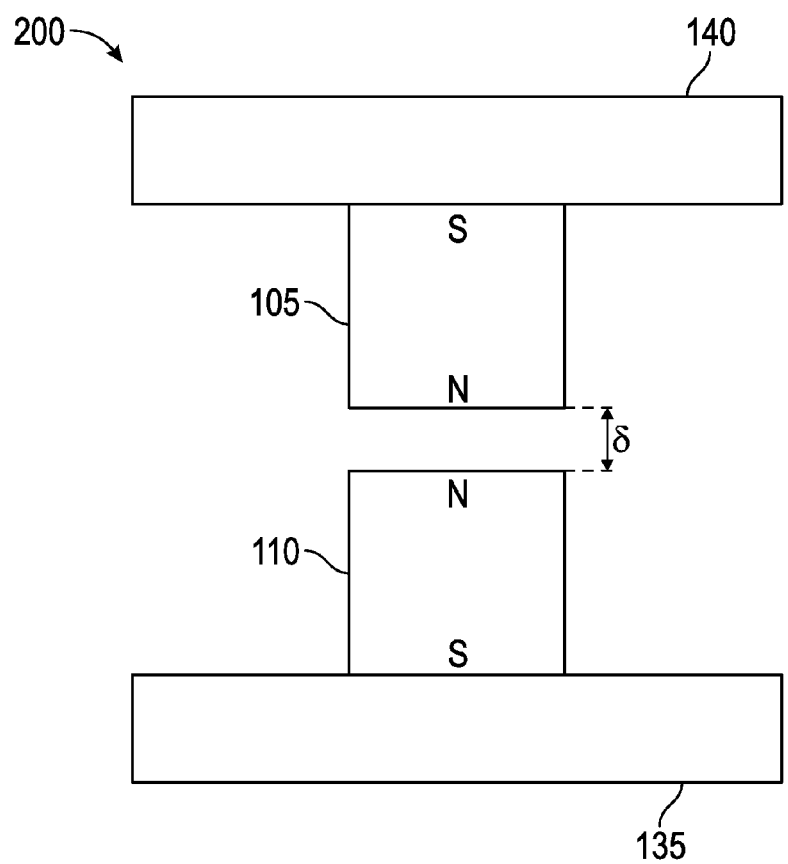
FIG. 2 depicts a block diagram of exciters in relation to a mass flow meter tube in accordance with the disclosed embodiments.

The exciters 105 and 110 include 2 electromagnets that are installed in a dual tube mass flow meter primary 100 face to face, as shown in FIGS. 1 and 2. The exciters drive vibration of tubes 135 and 140 at a natural frequency. In order to get the vibration signal, the position sensors 141, 142, 143, and 144 can be symmetrically installed on tubes 135 and 140. The test media is input at inlet 115 and output from outlet 120. When there is no fluid in the tubes and the exciters 105 and 110 are working, the signal from the position sensors is the same. However, if test media is flowing in tubes 135 and 140, there is a phase difference related to the position signals from the two correlated position sensors installed on the tubes. This phase difference, caused by Carioles force when fluid is present in the tubes, is related to the fluid speed of the test media. Thus, by determining the phase difference the mass flow can be calculated.

Because the tubes vibrate at a natural frequency, the exciter also needs to induce vibration at this frequency. In normal operation, the frequency of the exciter may be between 50-60 Hz, but the tubes natural frequency may be approximately 500 Hz. Thus, the disclosed embodiments can be configured to operate at this frequency also. It should be appreciated that other operating frequency ranges are possible depending on design considerations.

It is important to note that the position sensors must not be out of phase when test media is not flowing through tubes 135 and 140. In one embodiment of the invention, the exciter may be characterized as a dual exciter as illustrated in FIG. 2. It is important to note that both exciters 105 and 110 are the same and may be characterized as a single dual exciter. Both exciters 105 and 110 are comprised with the same high frequency E shaped electromagnets. The dual exciter may comprise electromagnets 105 and 110 which are arranged face to face as shown in FIG. 2. The exciters 105 and 110 are installed on tubes 135 and 140, respectively, such that a suitable distance δ 200, separates them. Unlike prior art exciters, the two exciters 105 and 110 and the associated magnets of the embodiments disclosed herein are separate, so there is no mechanical conflict between them. Because the electromagnets are same, the vibration induced in tubes 140 and 135 are also the same. Thus, the inner force of mass flow primary 100 disclosed herein can be balanced by the dual exciter comprising exciters 105 and 110.

Figure 3:
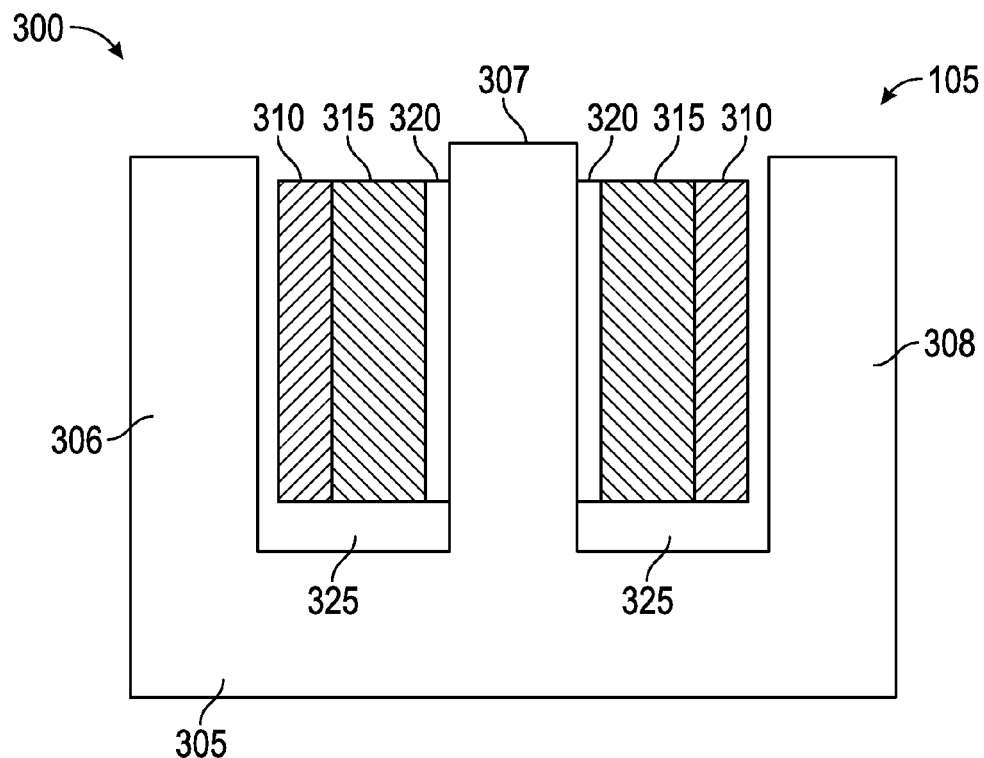
FIG. 3 depicts a block diagram of an exciter in accordance with an embodiment of the invention.

FIG. 3 illustrates an exemplary embodiment of an exciter, such as exciter 105 associated with embodiments of the invention. The exciter 105 comprises an E shaped plate 300. It should be appreciated that the E-shaped plate may be formed of silicon steel or other suitable material. The plate 300 includes a base 305 and three prongs (or struts) 306, 307, and 308 forming an "E" shape. Prong 306 and prong 308 can be characterized as outer prongs (or outer struts). Prong 307 can be characterized as an inner prong (or inner strut). Two wire windings 310 and 315, preferably made of copper, are configured on the silicon steel plate 300. A bone 320 may be configured to engage the wire windings 310 and 315 and the plate 300. It should be noted that a void 325, generally filled with air is left between the base 305 of plate 300, the wire windings 310 and 315, and bone 320.

The coil windings 310 and 315 can be connected to a power source. When a current is provided to the windings 310 and 315, an electromagnet is formed. The induced magnetic field causes the windings 310 and 315 and bone 320 to oscillate along the plate 300 thereby vibrating the tube connected to the exciter 105. The embodiments described herein provide an exciter that will work at frequencies above 550 Hz.

A single winding layer of wire will result in a magnet field given by equation 1:

$$B_0 = B_m \sin \omega t \tag{1}$$

The force can be calculated by:

$$f = \frac{10^7}{8\pi} B_0^2 S_0 = \frac{10^7}{8\pi} B_m^2 S_0 \sin^2 \omega t \tag{2}$$

$$= F_m \sin^2 \omega t$$

$$= \frac{1}{2} F_m - \frac{1}{2} F_m \cos 2\omega t$$

Then the average force is:

$$F = \frac{1}{T} \int_0^T f \, dt = \frac{1}{2} F_m = \frac{10^7}{16\pi} B_m^2 S_0 [N] \tag{3}$$

And the maximum force is given by:

$$F_m = \frac{10^7}{8\pi} B_m^2 S_0 \tag{4}$$

So when there are N layers of copper wire in 1 electromagnet, the force is:

$$F_{total} = F_m \tag{5}$$

Figure 4:
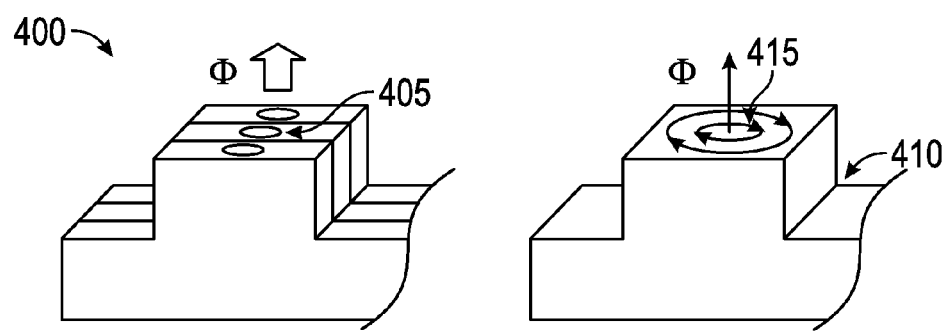
FIG. 4 illustrates the inducement of eddy currents in accordance with another embodiment of the invention.

Selecting the plate to be formed of silicon plated steel is advantageous because when the magnet is moving at high frequency, the plate 300 does not affect the high quality magnetic field and can reduce the eddy loss. Therefore, in embodiments disclosed herein the traditional steel core design is replaced by a silicon plated steel design. This reduces alternating flux and improves on steel core resistance. Induced eddy currents can be limited to a suitable range and core heat can be avoided during operation. FIG. 4 illustrates eddy currents 405 associated with the disclosed silicon plated group 400 as compared to the eddy current 415 associated with a traditional steel core 410.

Additionally, the E-shaped structure of the exciter is designed to provide a high quality magnetic field. The multilayer wire winding 310 and 315 can be used in concert with a parallel circuit. This windings can be loaded with a high current thereby providing a very strong magnetic field.

Figure 5:
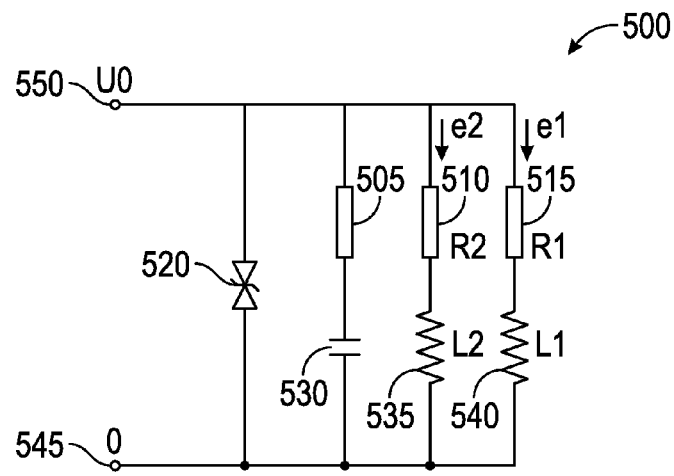
FIG. 5 depicts a circuit diagram of a protection circuit in accordance with an embodiment of the invention.

FIG. 5 illustrates a circuit diagram of a protection circuit 500 for one of coils 310 or 315. The circuit can include resistors 505, 510, and 515 in parallel with a Zener diode 520. The circuit includes capacitor 530, and inductors 535 and 540. The reference voltage is shown at 545 and the voltage at 550.

Figure 6:
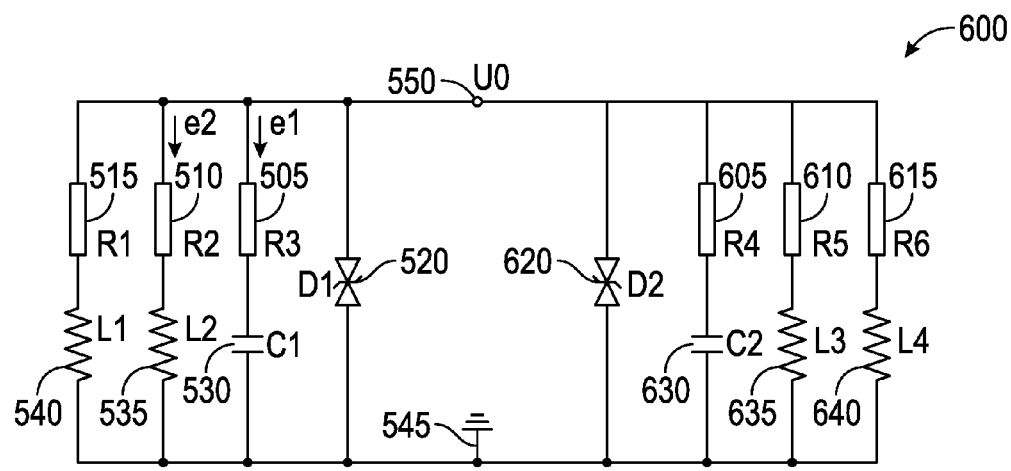
FIG. 6 depicts a circuit diagram of an exciter circuit in accordance with an embodiment of the invention.

A complete dual exciter circuit 600, which includes circuits for both exciters 105 and 110 (and associated wire windings) is shown in FIG. 6 including like elements from protection circuit 500. Dual exciter circuit 600 includes resistors 605, 610, and 615, inductors 635 and 640, capacitor 630, and Zener diode 620.

In another embodiment, the frequency can be changed easily according to an outside circuit. In practice, it is important to match the natural frequency requirement dictated by the physical characteristics of the tube, which can be determined empirically. This is necessary because different manufacturing techniques often result in different natural frequencies for a given tube.

Figure 7:
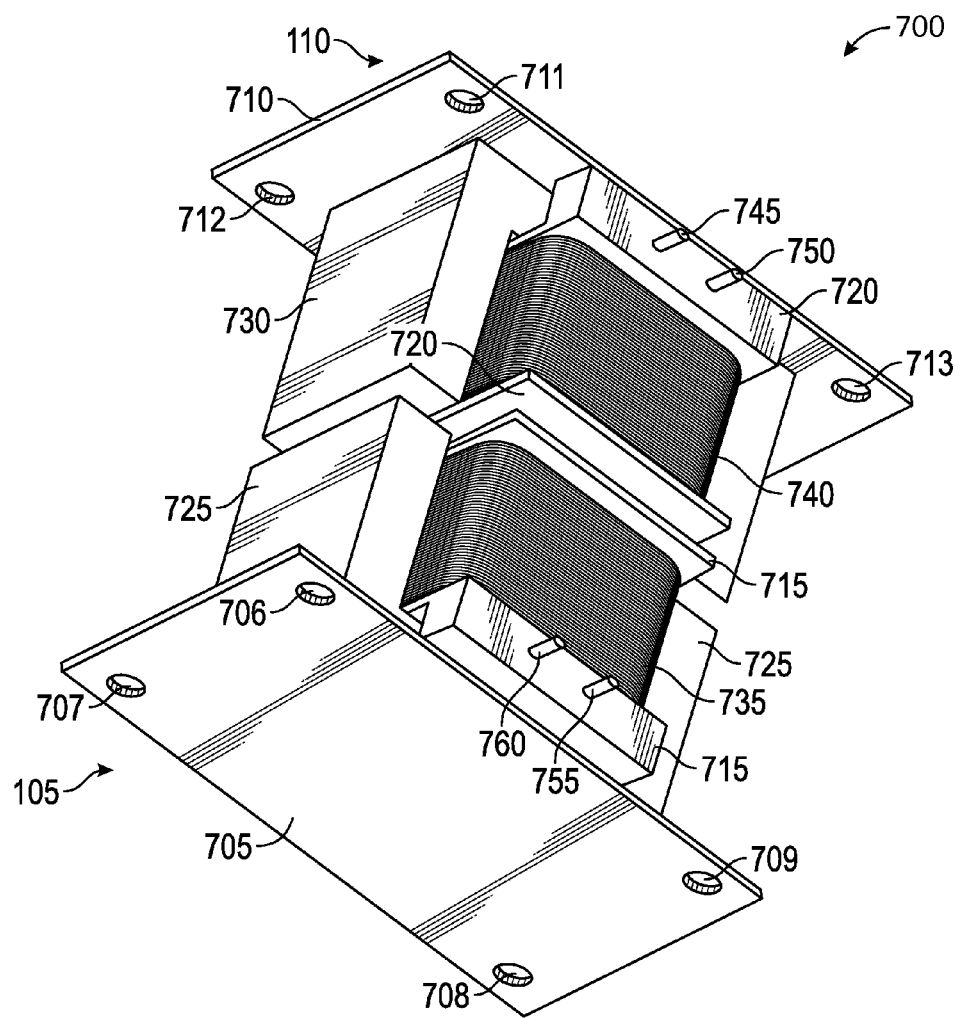
FIG. 7 depicts a perspective view of a dual exciter arrangement in accordance with another embodiment of the invention.

FIG. 7 illustrates an E-shaped dual exciter 700 in accordance with embodiments of the invention. The E-shaped dual exciter includes two installation bases 705 and 710, one for each of the two exciters 105 and 110. The installation bases are formed with mounting holes. Installation base 710 includes mounting holes 711, 712, 713, and a fourth mounting hole (not shown) configured on the corners of installation base 710. Likewise, installation base 705 includes mounting holes 706, 707, 708, and 709 on its corners. Installation bases 705 and 710 are configured to be mounted to a tube such as tubes 135 and 140. The mounting holes can be used to hold the installation base to the tube or to another structure if necessary. The mounting holes can be configured to accept rivets, screws, nails, bolts, or other such connecting means.

The installation base 705 is rigidly fastened to plate 725. Installation base 710 is also rigidly fastened to plate 730. Plate 730 is arranged to be in communication with bone 720. The arrangement allows the bone to move along a prong of the E-shaped plate 730. Similarly, E-shaped plate 725 is arranged in communication with bone 715 in order to allow bone 715 to move along a prong of E-shaped plate 725.

Movement of bones 715 and 720 is induced by electromagnets 735 and 740, respectively. Bone 720 includes current inlet pin 745 and current outlet pin 750. Inlet pin 745 and outlet pin 750 provides electrical connection between electromagnet 740 and a power source. Similarly, bone 715 includes a current inlet pin 755 and current outlet pin 760. It should be appreciated that the power source may provide power to each electromagnet or separate power sources may be independently used to provide power to each electromagnet depending on design considerations.

Figure 8:
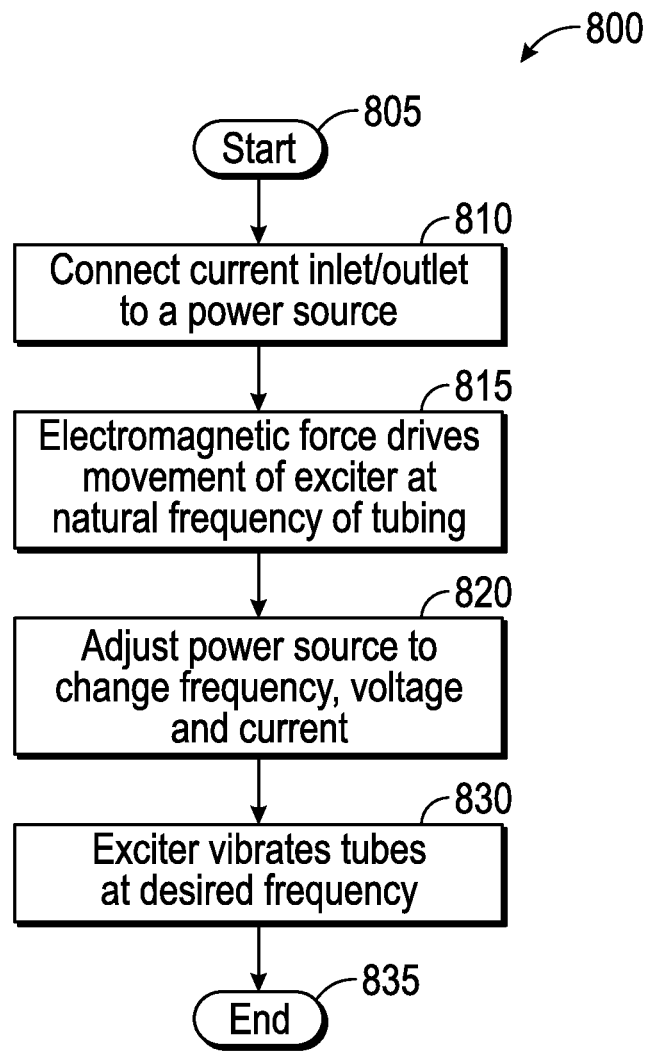
FIG. 8 depicts a flow chart illustrating logical operational steps associated with a method for inducing vibration of an exciter in accordance with another embodiment of the invention.

FIG. 8 illustrates logical operational steps associated with a method for inducing vibration in a mass flow primary tube, in accordance with embodiments of the invention. The method begins at step 805.

At step 810, a current inlet and current outlet associated with an exciter can be connected to a power source. When power is provided to the electromagnet, the magnet force results in mechanical movement of the electromagnet and bone arrangement. Power can be supplied to the exciter via the power source. At step 815, the current pulse provided to the electromagnet can be adjusted so that the mechanical motion of the arrangement matches the natural frequency of the associated tubing. In one embodiment, this may be 24 volts and 1000 mA, however, other current and voltages may also be used. At step 820, the electromagnetic force generated by the electromagnet causes the exciter to move, preferably at the natural frequency of the tubing. The power source may be adjusted at step 825 to adjust the frequency, voltage, and current supplied to the electromagnet as necessary. This allows for the exciter to vibrate the tubing at the input conditions desired/required by the associated mass flow primary. The method ends at step 835.

The embodiments disclosed herein serve to improve the magnet field quality of the exciter. The multi-layered copper coil is designed to reduce eddies. The silicon plates are selected in addition to the E-shaped electromagnet to improve magnet field and reduce core heat. Because the exciter movement is driven by magnetic force only, the magnets can be installed face to face. The amplitude of the vibration may be easily controlled by changing the input current to the electromagnets. Likewise, the frequency, voltage, and current to the electromagnets are easy to control and adjust using external circuitry. This allows easy adjustment of the exciter frequency to match the natural frequency of the associated pipeline.

Based on the foregoing, it can be appreciated that a number of embodiments, preferred and alternative, are disclosed herein. For example, in one embodiment, an exciter comprises a rigid plate comprising a base, two outer struts, and an inner strut; at least one electromagnet formed over the inner strut; a protection circuit associated with the electromagnet; and an exciter circuit configured to induce a current in the electromagnet in order to cause vibration of the exciter.

In another embodiment, the rigid plate comprises a silicon steel plate configured to reduce alternating flux, reduce resistance, and provide operation at high frequency. Additionally, the at least one electromagnet comprises at least two wire windings configured to provide high quality magnetic force and strong magnetic field. The exciter can further comprise a bone structure configured to engage the electromagnet and the rigid plate.

In another embodiment, a current inlet pin and a current outlet pin are provided. A protection circuit further comprises at least three resistors and a Zener diode arranged in parallel.

In another embodiment, a mass flow meter is disclosed wherein the at least one exciter is configured to mount on a flow tube associated with the mass flow meter.

In an alternative embodiment, a system for inducing vibration in a mass flow primary comprises two exciters fixedly attached to tubes of a mass flow primary, each of the two exciters comprising: a rigid plate comprising a base, two outer struts, and an inner strut; at least one electromagnet formed over the inner strut; a power source configured to provide power to the electromagnet; and a protection circuit configured to induce a current in the electromagnet in order to cause vibration of the exciter.

In another embodiment, the rigid plate comprises a silicon steel plate configured to reduce alternating flux, reduce resistance, and provide operation at high frequency. The at least one electromagnet comprises a plurality of layers of wire windings configured to provide high quality magnetic force and strong magnetic field. A bone structure can be configured to engage the electromagnet and the rigid plate.

In another embodiment of the system, a current inlet pin and a current outlet pin are configured to provide power from the power source to the at least one electromagnet. A protection circuit further comprises at least three resistors and a Zener diode arranged in parallel.

In yet another embodiment, a method for inducing vibration of a tube comprises fixedly attaching at least one exciter to at least one tube; providing power to at least one electromagnet formed on an inner strut of a rigid plate comprising a base, two outer struts, and an inner strut in order to induce mechanical motion; and adjusting the power provided to the electromagnet to match a natural frequency of the at least one tube thereby inducing vibration of the tube.

The method can further comprise reducing alternating flux, reducing resistance, and providing operation of the exciter at high frequency by configuring the rigid plate as a silicon steel plate.

In another embodiment, the at least one electromagnet is provided as a plurality of layers of wire windings configured to provide high quality magnetic force and strong magnetic field. The method can include configuring a bone structure to engage the electromagnet and the rigid plate.

In another embodiment, providing power to at least one electromagnet further comprises providing current to a current inlet pin and a current outlet pin and regulating a power supply to the electromagnet with a protection circuit. The protection circuit further comprises at least three resistors and a Zener diode arranged in parallel.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. An exciter comprising:
   a rigid plate comprising a base, two outer prongs, and an inner prong;
   at least one electromagnet formed over said inner prong;
   a protection circuit associated with said electromagnet wherein said protection circuit further comprises at least three resistors and a Zener diode arranged in parallel; and
   an exciter circuit configured to induce a current in said electromagnet in order to cause vibration of said exciter.

2. The exciter of claim 1 wherein said rigid plate comprises a silicon steel plate configured to reduce alternating flux, reduce resistance, and provide operation at high frequency.

3. The exciter of claim 1 wherein said at least one electromagnet comprises at least two wire windings configured to provide high quality magnetic force and strong magnetic field.

4. The exciter of claim 3 further comprising a bone structure configured to engage said electromagnet and said rigid plate.

5. The exciter of claim 4 further comprising a current inlet pin and a current outlet pin.

6. The exciter of claim 1 further comprising a mass, flow meter, wherein said at least one exciter is configured to mount on a flow tube associated with said mass flow meter.

7. A system for inducing vibration in a mass flow primary comprising:
   two exciters fixedly attached to tubes of a mass flow primary, each of said two exciters comprising:
   a rigid plate comprising a base, two outer prongs, and an inner prong;
   at least one electromagnet formed over said inner prong;
   a power source configured to provide power to said electromagnet; and
   a protection circuit configured to induce a current in said electromagnet in order to cause vibration of said exciter, wherein said protection circuit further comprises at least three resistors and a Zener diode arranged in parallel.

8. The system of claim 7 wherein said rigid plate comprises a silicon steel plate configured to reduce alternating flux, reduce resistance, and provide operation at high frequency.

9. The system of claim 8 wherein said at least one electromagnet comprises a plurality of layers of wire windings configured to provide high quality magnetic force and strong magnetic field.

10. The system of claim 9 further comprising a bone structure configured to engage said electromagnet and said rigid plate.

11. The system of claim 10 further comprising a current inlet pin and a current outlet pin configured to provide power from said power source to said at least one electromagnet.

12. A method for inducing vibration of a tube comprising:
   fixedly attaching at least one exciter to at least one tube;
   providing power to at least one electromagnet formed on an inner prong of a rigid plate comprising a base, two outer prongs, and said inner prong in order to induce mechanical motion;
   regulating said power to said at least one electromagnet with a protection circuit wherein said protection circuit further comprises at least three resistors and a Zener diode arranged in parallel; and
   adjusting said power provided to said electromagnet to match a natural frequency of said at least one tube thereby inducing vibration of said tube.

13. The method of claim 12 further comprising:
   reducing alternating flux;
   reducing resistance; and
   providing operation of said exciter at high frequency by configuring said rigid plate as a silicon steel plate.

14. The method of claim 12 further comprising providing said at least one electromagnet as a plurality of layers of wire windings configured to provide high quality magnetic force and strong magnetic field.

15. The method of claim 14 further comprising configuring a bone structure to engage said electromagnet and said rigid plate.

16. The method of claim 12 wherein providing power to at least one electromagnet further comprises providing current to a current inlet pin and a current outlet pin.

* * * * *